_United States Patent Office_

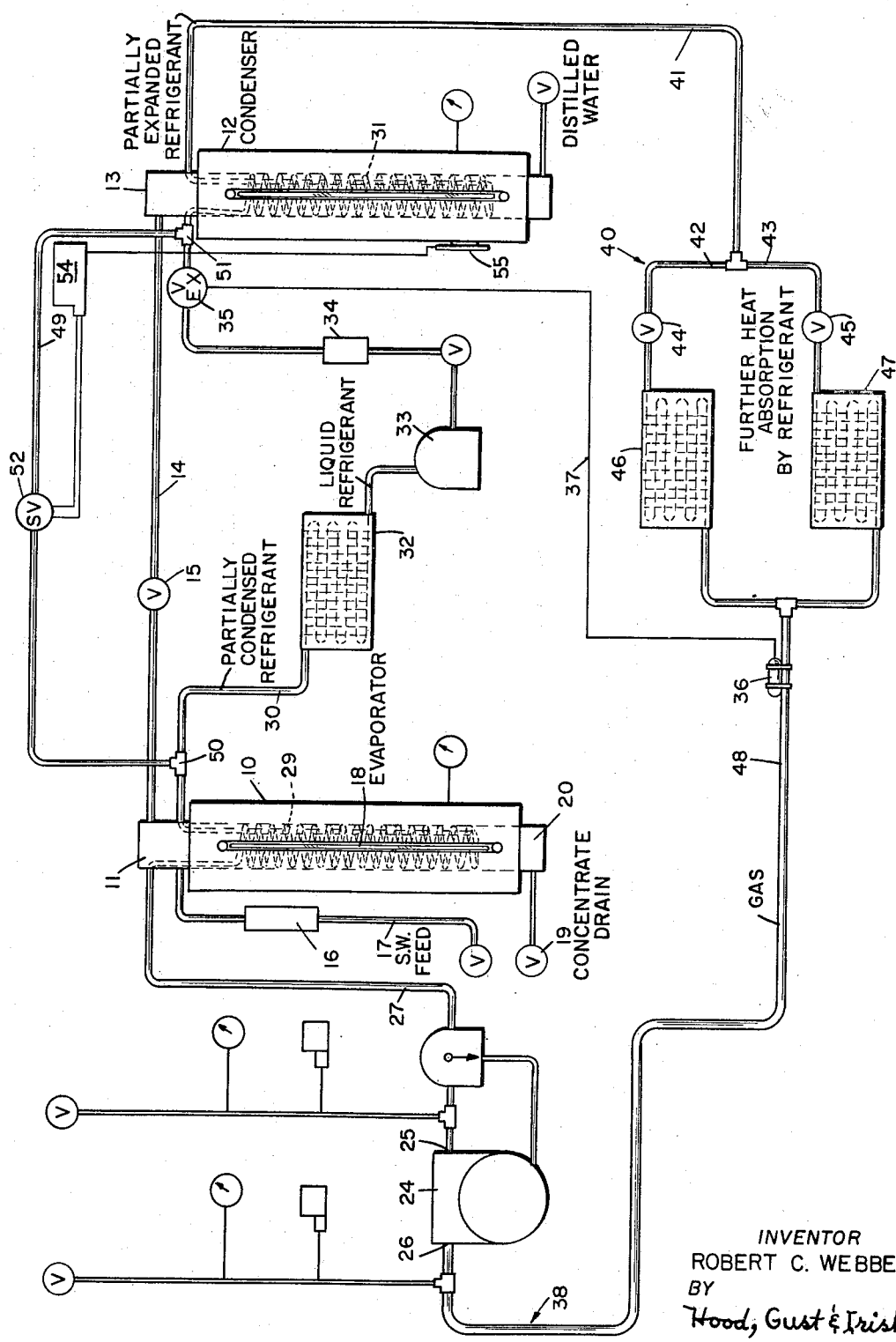

3,492,205
Patented Jan. 27, 1970

3,492,205
DISTILLATION SYSTEM AND METHOD
Robert C. Webber, Marion, Ind.
(P.O. Box 217, Indianapolis, Ind. 46206)
Filed Nov. 17, 1967, Ser. No. 683,891
Int. Cl. F25b *27/00;* C02b *1/06;* B01d *3/42*
U.S. Cl. 203—26                                    4 Claims

ABSTRACT OF THE DISCLOSURE

A distillation system and method in which a condenser in a fluid phase-change refrigerating system supplies the heat to evaporate, in one chamber, the solvent of a liquid solution, while an evaporator in said refrigerating system extracts heat, in a connected chamber, from the vapor so produced to condense that vapor and cool the condensate; additional condenser and evaporator means being included in the system if required to produce the intended distillation effect upon the solution; the system being capable of use, in small sizes, as a portable desalinator for sea water or to render potable any water holding noxious solids in solution.

---

The primary object of the present invention is to provide apparatus and a method whereby, with maximum efficiency, the solvent component of a liquid solution may be separated from the solids thereof. Essentially, the invention resides in the concept of utilizing the components of a phase-change refrigeration system to supply the heat necessary to evaporate such solvent component, while drawing a major portion of that heat from the distillation system in the step of recondensing the vaporized liquid.

A further object of the invention is to provide apparatus for carrying out a method of the above character which is capable of being produced in relatively small, portable sizes, the compressor of the refrigeration system being driven by a self-contained prime mover such as an internal combustion engine operating on gasoline, kerosene, fuel oil or propane or such as a nuclear-energized engine; whereby such a portable device may be an element of a survival kit for persons lost at sea, to desalinate sea water. As will be apparent from the following description, when the device disclosed herein is so used, it will not only supply potable water but inherently cool that water to a delectable temperature.

A further object of the invention is to provide, in such a system, an auxiliary evaporator in the refrigeration cycle so arranged as to absorb, from the ambient atmosphere, and/or from the engine exhaust, heat which may be utilized in the evaporation of the liquid component of the solution to be distilled.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described or in the specific steps stated, so long as the scope of the appended claims is not violated.

The drawing is a somewhat diagrammatic illustration of an apparatus embodying the present invention and capable of carrying out the method disclosed herein.

As shown in the drawing, I provide a distilland evaporator tank 10 which may have a removable, vapor-tight closure head 11, and a distillate condenser tank 12 having a similar head 13. Conduit means 14 preferably connected between the heads 11 and 13 provides communication between the upper portion of the tank 10 and the tank 12, suitable valve means 15 being provided in the conduit 14.

The tank 10 may be charged with a solution (sometimes referred to hereinafter as a distilland) by dumping the solution into the tank after removal of the head 11; or, preferably, said tank 10 may be provided with a float-controlled inlet valve 16 dominating the flow of solution to the tank through a pipe, hose or the like 17 leading from a suitable source of supply (not shown). Desirably, a sight glass 18 may be provided on the tank 10, and a drain valve 19 may preferably be provided near the bottom of said tank. Suitable means, suggested at 20 in the drawing, will be provided for periodically removing solids, or highly-concentrated solution, from the bottom of the tank 10.

A conventional refrigerant compressor 24, having an outlet port 25 and an inlet port 26, may be driven and controlled in any suitable, conventional manner. In a permanent, stationary installation, the compressor will preferably be driven by an electric motor with conventional controls; but in a portable unit, a self-energizing prime mover of some kind will be used.

Conduit means 27 connects the outlet port 25 of the compressor 24 with a coil 29 which is disposed in heat-exchanging relation with the solution contained in the evaporator tank 10. Although little or no actual liquefaction of refrigerant will ordinarily occur in the coil 29, since the hot refrigerant gas will usually give up enough heat, without significant change of phase, to vaporize the ambient liquid in the tank 10, that coil may be referred to as a "refrigerant condenser coil" because heat is drawn from the refrigerant therein and transferred to the ambient liquid. I presently believe that the most advantageous arrangement to establish the necessary heat-exchanging relation will be to dispose the condenser coil 29 inside the tank 10 where it may be supported between the heads 11 and 20, and will be immersed in, and thus in direct contact with, the solution in said tank. Conduit means 30 connects the coil 29 with a refrigerant evaporator coil 31 which is disposed in heat-exchanging relation with the fluid in the condenser tank 12. I presently believe that the evaporator 31 should most advantageously be disposed inside the tank 12 where it will be in direct contact with the fluid within said tank.

In most installations, it will be desirable to connect an auxiliary refrigerant condenser 32 and a receiver 33, as well as a dryer 34, in series in the conduit means 30. A conventional expansion device 35 will also be provided, ahead of the evaporator 31, to dominate refrigerant flow to said evaporator, said device being under the control of temperature-responsive means 36, later to be described, operatively connected to said device 35 by means indicated by the reference numeral 37.

Conduit means indicated generally by the reference numeral 38 connects the evaporator 31 with the intake port 26 of the compressor to complete the refrigerant circuit.

If desired, vibration eliminators of conventional character (not shown) may be inserted in the conduit means 27 and in the conduit means 38.

It will now be apparent that, when the tank 10 is 1arged with a liquid solution or distilland and the com-·essor 24 is operated, gaseous refrigerant will be com-·essed, and thereby heated, in the compressor 24 and will ; delivered through the conduit means 27 to the con-·nser 29. There, heat will be delivered from the hot, )mpressed gas to the body of liquid in the tank 10 to ·evate the temperature of the liquid body sufficiently to 1use distillate vapor to flow through the conduit means 1 to the tank 12. At least a portion of the gaseous re- ·igerant may thus be liquefied; and the refrigerant will )w through the condenser 32 where the phase change ill be completed, and thence through the expansion de-·ce 35 to the evaporator 31 in the tank 12. The auxiliary )ndenser 32 may be cooled in any suitable, conventional 1shion.

In the evaporator 31, heat will be absorbed from the istillate fluid within the tank 12 to evaporate some or all [ the refrigerant flowing through said evaporator 31, 1ereby rapidly condensing the vapor delivered to the tank 2 from tank 10, and cooling the condensed liquid to any ·sired temeprature which may be predtermined by selec-·on of a suitable refrigerant and by calibration of the ·vice 35 in accordance with well known principles. For 1stance, if Freon-22 is used as the refrigerant, the device 5 may be readily adjusted to maintain a liquid tempera-1re in the tank 12 of approximately 45° F.

In most instances, additional heat beyond that attain-)le by absorption in the tank 12 will be required to render 1e system effective to accomplish the deired results. To 1at end, I provide an auxiliary refrigerant evaporator, )rming a portion of the conduit means 38, and indicated 1 the drawing generally by the reference numeral 40. As 10wn, conduit means 41 connects the evaporator 31 with ranch pipes 42 and 43 leading, respectively, through alves 44 and 45, which may be manually controlled, to vaporator coils 46 and 47 which are exposed to the mbient atmosphere. Said coils both discharge into the ortion 48 of the conduit means 38. If desired, means 1ay be provided to move atmospheric air past the evapo-1tor coils 46 and 47.

The heat-sensitive element 36 and its connection 37 to 1e device 35 may be, for instance, of the character illus-·ated at 28 in my prior patent No. 3,238,738 or of the 1aracter illustrated at 35 and 36 in my prior patent fo. 2,709,340; and said element 36 may preferably be so isposed as to sense the temperature of the refrigerant mantaing from the evaporators 46 and 47.

In order to guard against freezing in the tank 12 or n the coils of the evaporator 31, while protecting the ·frigeration system, I prefer to provide by-pass conduit 1eans 49 connected to the conduit means 30 at points 50 nd 51 to provide a flow path, controlled by a valve 52, ·hereby hot, gaseous refrigerant may be delivered, when esired, to the coil 31. The valve 52 may be manually ontrolled; or it may, if desired, be controlled in response ) temperature of the fluid in the tank 12. For instance, 1e valve 52 may be solenoid-actuted, as shown, the )lenoid being dominated by a conventional switch 54 ·hich, in turn, is controlled by a sensing element 55 rranged in heat-exchanging relation to the tank 12. The rrangement is such that, if ice should form on the evapo-ator coil 31, the valve 52 will be briefly opened to supply "shot" of hot refrigerant to said coil to melt away the :e or frost.

As has been indicated, the apparatus and the method f the present disclosure are adaptable for separating the )lvent component from the solid components of any .quid solution, although the inherent characteristics of the 1vention are such as to render it particularly adaptable to 1e desalination of sea water. It is well known that the .eat ratio efficiency which can be achieved through the 1edium of a phase-change refrigreation system far ex-eeds that attainable by the mere combustion of an equiv-alent quantity of fuel. Thus, through the use of the present invention, relatively small quantities of the fuel required to drive the compressor 24 will accomplish the distalla-tion, and thus the desalination, of relatively large quantities of water; and the efficiency of the system to that end is, of course, greatly increased by the quantity of heat which can be extracted from the ambient atmosphere through the use of the auxiliary evaporator 40 in the illustrated apparatus. Additionally, the system inherently provides a supply of cold, distilled water for drinking, instead of the hot or tepid water which would be supplied by a distal-lation system in which the evaporation of the liquid com-ponent of a solution was effected by the mere combustion of fuel.

A still further inherent advantage of the disclosed system can be achieved, when the compressor 24 is driven by an engine of the character above suggested, by con-ducting the exhaust from the engine into heat-exchanging relation with the auxiliary evaporator means 40, whereby that exhaust heat is absorbed into the refrigating system.

I claim as my invention:

1. A distillation system comprising a distilland evapo-rator tank, a distillate condenser tank, conduit means pro-viding communication between said tanks, and a closed refrigeration system comprising a compressor having an inlet and an outlet, a refrigerant heat exchange coil dis-posed in heat-exchanging relation with liquid in said dis-tilland evaporator tank to evaporate said distilland, con-duit means for conducting compressed, gaseous refriger-ant from the outlet of said compressor to said refrigerant heat-exchange coil, a refrigerant evaporator disposed in heat-exchanging relation with fluid in said distillate con-denser tank, conduit means including an expansion device for conducting refrigerant from said refrigerant heat-ex-change coil to said refrigerant evaporator, conduit means for conducting refrigerant from said refrigerant evapora-tor to the inlet of said compressor, and a refrigerant con-denser disposed outside and between said tanks and con-nected in series in the conduit means for conducting re-frigerant from said first-named refrigerant heat-exchange coil to said refrigerant evaporator.

2. A distillation system comprising a distilland evapo-rator tank, a distillate condenser tank, conduit means pro-viding communication between said tanks, and a closed refrigeration system comprising a compressor having an inlet and an outlet, a refrigerant condenser disposed in heat-exchanging relation with liquid in said distilland evaporator tank, conduit means for conducting com-pressed, gaseous refrigerant from the outlet of said com-pressor to said refrigerant condenser, a refrigerant evapo-rator disposed in heat-exchanging relation with fluid in said distillate condenser tank, conduit means including an expansion device for conducting refrigerant from said re-frigerant condenser to said refrigerant evaporator, con-duit means for conducting refrigerant from said refriger-ant evaporator to the inlet of said compressor, and an auxiliary refrigerant evaporator connected in series in the conduit means for conducting refrigerant from said first-named refrigerant evaporator to the inlet of said com-pressor.

3. The system of claim 1 in which said expansion de-vice is adjustable, and means responsive to the tempera-ture of refrigerant emerging from said auxiliary evapora-tor for adjusting said expansion device.

4. The method of distilling a solution which comprises the steps of compressing a gaseous refrigerant in a closed cycle to provide a hot refrigerant gas, bringing the com-pressed refrigerant hot gas into heat-exchanging relation to a confined body of said solution to evaporate a portion of the solvent component of said solution and produce a solvent vapor and to condense a portion of the refriger-ant, conducting the uncondensed refrigerant gas to a con-denser and condensing the gas to liquid refrigerant, con-ducting the solvent vapor to a closed chamber, expand-ing the liquid refrigerant in heat-exchanging relation with said solvent vapor in the chamber and simultaneously evaporating a portion of the refrigerant to cool and condense the solvent vapor, completing the evaporation of the refrigerant by conducting the same through a refrigerant evaporator coil heat-exchanging means exposed to ambient atmosphere, and then recompressing the gaseous refrigerant for return to the distillation cycle.

References Cited

UNITED STATES PATENTS

| | | | |
|---|---|---|---|
| 2,305,640 | 12/1942 | Roth | 202—235 X |
| 2,389,789 | 11/1945 | Latham | 203—2 |
| 2,451,682 | 10/1948 | Lund | 62—151 |
| 3,091,098 | 5/1963 | Bowers. | |
| 3,203,875 | 8/1965 | Sturtevant | 203—173 |
| 3,284,318 | 11/1966 | Coanda et al. | 202—160 |
| 3,311,543 | 3/1967 | Loebel | 203—100 |
| 3,312,078 | 4/1967 | Aerov et al. | 62—112 |
| 3,399,118 | 8/1968 | Williamson | 203—11 X |
| 3,300,392 | 1/1967 | Ross et al. | 202—176 |
| 3,234,109 | 2/1966 | Lustenader | 202—177 X |

FOREIGN PATENTS

| | | |
|---|---|---|
| 397,275 | 8/1933 | Great Britain. |
| 24,930 | 12/1956 | Germany. |

NORMAN YUDKOFF, Primary Examiner

F. E. DRUMMOND, Assistant Examiner

U.S. Cl. X.R.

62—238; 202—181, 235

UNITED STATES PATENT OFFICE
CERTIFICATE OF CORRECTION

Patent No. 3,492,205              Dated January 27, 1970

Inventor(s)   Robert C. Webber

It is certified that error appears in the above-identified patent and that said Letters Patent are hereby corrected as shown below:

Column 3, line 48, "emantaing" should be -- emanating -- same column, line 74, "refrigreation" should be -- refrigeration --.
Column 4, line 61 (Claim 3, line 1), "claim 1" should be -- claim 2 --.

Signed and sealed this 23rd day of June 1970.

(SEAL)
Attest:

EDWARD M. FLETCHER, JR.                WILLIAM E. SCHUYLER, JR.
Attesting Officer                      Commissioner of Patents